US009108600B2

(12) United States Patent
Hartmann et al.

(10) Patent No.: US 9,108,600 B2
(45) Date of Patent: Aug. 18, 2015

(54) METHOD AND DEVICE FOR PERFORMING CLOSED-LOOP OR OPEN-LOOP CONTROL OF THE DRIVING STABILITY OF A VEHICLE

(75) Inventors: Bernd Hartmann, Bad Homburg (DE); Alfred Eckert, Mainz-Hechtsheim (DE); Georg Roll, Heusenstamm (DE); Stefan Fritz, Erzhausen (DE)

(73) Assignee: Continental Teves AG & Co. oHG (DE)

( * ) Notice: Subject to any disclaimer, the term of this patent is extended or adjusted under 35 U.S.C. 154(b) by 189 days.

(21) Appl. No.: 13/318,952

(22) PCT Filed: Apr. 29, 2010

(86) PCT No.: PCT/EP2010/055841
§ 371 (c)(1),
(2), (4) Date: Nov. 4, 2011

(87) PCT Pub. No.: WO2010/127994
PCT Pub. Date: Nov. 11, 2010

(65) Prior Publication Data
US 2012/0065861 A1    Mar. 15, 2012

(30) Foreign Application Priority Data
May 7, 2009    (DE) .......................... 10 2009 020 210

(51) Int. Cl.
*B60T 8/1755*    (2006.01)
(52) U.S. Cl.
CPC .......... *B60T 8/17558* (2013.01); *B60T 8/17551* (2013.01); *B60T 2201/022* (2013.01); *B60T 2201/122* (2013.01)
(58) Field of Classification Search
CPC ... B60T 7/22; B60T 8/17551; B60T 8/17558; B60T 2201/022; B60T 2201/122
USPC ..................................................... 701/70–72
See application file for complete search history.

(56) References Cited

U.S. PATENT DOCUMENTS 5,694,321 A  *  12/1997  Eckert et al. .................... 701/91
5,711,023 A      1/1998  Eckert
(Continued)

FOREIGN PATENT DOCUMENTS

DE    19515048 A1    5/1996
DE    10060498 A1    10/2001
(Continued)

OTHER PUBLICATIONS

JPO machine translation of JP 2007-22232 (original JP document published Feb. 1, 2007).*
(Continued)

*Primary Examiner* — Behrang Badii
*Assistant Examiner* — David Testardi
(74) *Attorney, Agent, or Firm* — RatnerPrestia

(57) ABSTRACT

The invention relates to a method and a device for performing open-loop or closed-loop control of the driving stability of a vehicle and for avoiding collisions with an object located in the traffic lane. The invention also relates to a closed-loop driving stability controller. The method according to aspects of the invention comprises: determining based on environmental signals whether a critical situation in terms of driving dynamics, in particular an imminent collision, exists, calculating an avoidance path if a critical situation in terms of driving dynamics exists, determining based on a plurality of input variables pressures for individual brakes of the vehicle, and activating preparatory measures of the driving dynamics regulator, in particular dynamic switching over of closed-loop control parameters if the critical situation in terms of driving dynamics exists. The device and the closed-loop driving stability controller are suitable for carrying out the method.

5 Claims, 2 Drawing Sheets

Evasive Maneuver (example: simple lane change)

(56) References Cited

U.S. PATENT DOCUMENTS

| | | | | |
|---|---|---|---|---|
| 6,017,101 | A * | 1/2000 | Matsuda | 303/140 |
| 6,272,418 | B1 * | 8/2001 | Shinmura et al. | 701/72 |
| 6,289,281 | B1 * | 9/2001 | Shinmura et al. | 701/301 |
| 6,567,748 | B2 * | 5/2003 | Matsuno | 701/301 |
| 6,567,749 | B2 * | 5/2003 | Matsuura | 701/301 |
| 6,820,007 | B2 * | 11/2004 | Abe et al. | 701/301 |
| 6,959,970 | B2 * | 11/2005 | Tseng | 303/146 |
| 6,962,396 | B2 * | 11/2005 | Faye et al. | 303/191 |
| 7,015,805 | B2 * | 3/2006 | Knoop et al. | 340/467 |
| 7,035,735 | B2 * | 4/2006 | Knoop et al. | 701/301 |
| 7,734,418 | B2 * | 6/2010 | Shoda et al. | 701/301 |
| 7,778,753 | B2 * | 8/2010 | Fujiwara et al. | 701/41 |
| 8,126,626 | B2 * | 2/2012 | Zagorski | 701/70 |
| 2001/0039472 | A1 | 11/2001 | Isogai | |
| 2004/0030497 | A1 * | 2/2004 | Knoop et al. | 701/301 |
| 2004/0030498 | A1 | 2/2004 | Knoop | |
| 2004/0158377 | A1 | 8/2004 | Matsumoto | |
| 2004/0193374 | A1 | 9/2004 | Hac | |
| 2005/0004738 | A1 * | 1/2005 | Gronau et al. | 701/70 |
| 2005/0267683 | A1 | 12/2005 | Fujiwara | |
| 2006/0195231 | A1 | 8/2006 | Diebold | |
| 2007/0052530 | A1 | 3/2007 | Diebold | |
| 2007/0129891 | A1 | 6/2007 | Yano | |
| 2007/0294019 | A1 | 12/2007 | Nishira | |
| 2007/0299610 | A1 | 12/2007 | Ewerhart | |
| 2008/0046145 | A1 * | 2/2008 | Weaver et al. | 701/41 |
| 2008/0319610 | A1 * | 12/2008 | Oechsle et al. | 701/41 |
| 2009/0212930 | A1 | 8/2009 | Pfeiffer | |
| 2009/0222166 | A1 | 9/2009 | Arbitmann | |
| 2009/0234543 | A1 | 9/2009 | Groitzsch | |
| 2010/0211235 | A1 * | 8/2010 | Taguchi et al. | 701/1 |
| 2011/0082623 | A1 * | 4/2011 | Lu et al. | 701/41 |

FOREIGN PATENT DOCUMENTS

| | | | |
|---|---|---|---|
| DE | 10231556 A1 | 1/2003 | |
| DE | 102004006540 A1 | 8/2004 | |
| DE | 102004060053 A1 | 12/2005 | |
| DE | 102005031854 A1 | 2/2006 | |
| DE | 102004059002 A1 | 6/2006 | |
| DE | 102006010275 A1 | 12/2006 | |
| DE | 102005037479 A1 | 2/2007 | |
| DE | 102006036921 A1 | 4/2007 | |
| DE | 102007043419 A1 | 3/2008 | |
| DE | 10117722 B4 | 1/2010 | |
| EP | 0976627 A1 | 2/2000 | |
| EP | 1990250 A2 | 11/2008 | |
| JP | 2007022232 A * | 2/2007 | B60T 7/12 |
| WO | 02074638 A1 | 9/2002 | |
| WO | 2004085220 A1 | 10/2004 | |
| WO | 2004103798 A1 | 12/2004 | |
| WO | 2005047066 A1 | 5/2005 | |
| WO | 2005080133 A1 | 9/2005 | |
| WO | 2007031578 A1 | 3/2007 | |
| WO | 2007031580 A1 | 3/2007 | |
| WO | WO 2009/031500 * | 3/2009 | B60W 30/10 |

OTHER PUBLICATIONS

German Search Report issued in related Application No. DE 10 2010 028 384.3 dated Nov. 2, 2010 (with partial English translation).

International Search Report issued in PCT/EP2010/055841 filed Apr. 29, 2010, mailed Jul. 28, 2010.

* cited by examiner

METHOD AND DEVICE FOR PERFORMING CLOSED-LOOP OR OPEN-LOOP CONTROL OF THE DRIVING STABILITY OF A VEHICLE

CROSS REFERENCE TO RELATED APPLICATIONS

This application is the U.S. National Phase Application of PCT/EP2010/055841, filed Apr. 29, 2010, which claims priority to German Patent Application No. 10 2009 020 210.2, filed May 7, 2009, the contents of such applications being incorporated by reference herein.

FIELD OF THE INVENTION

The invention relates to a method for performing open-loop or closed-loop control of the driving stability of a vehicle and for avoiding collisions with an object which is located in the traffic lane, comprising the steps: determining based on environmental signals whether a critical situation in terms of driving dynamics, in particular an imminent collision, exists, calculating an avoidance path if a critical situation in terms of driving dynamics exists, determining based on a plurality of input variables pressures for individual brakes of the vehicle.

The invention also relates to a device for performing closed-loop control of the driving stability and for avoiding collisions having a closed-loop driving stability controller which contains means for acquiring input variables and for defining interventions into individual brakes of the vehicle, and having a sensor system which senses the surroundings of the vehicle and which emits and receives radar signals or lidar signals or receives video signals.

The method and device serve, in particular, to provide additional torque by selective interventions at individual brakes of the vehicle, with the result that driving stability of the vehicle is increased and a collision with an object which is located in the traffic lane is avoided. The term closed-loop driving stability control operation comprises, in particular, the principles for influencing the driving behavior of the vehicle as mentioned below. These are, preferably, an anti-slip brake controller (ABS) which is intended to prevent locking of individual wheels during a braking process, a traction controller (ASR) which prevents the spinning of the driven wheels, an electronic braking force distributor (EBV) which performs closed-loop control of the ratio of the braking forces between the front axle and rear axle of the vehicle, and a yaw moment closed-loop controller (GMR) which ensures that there are stable driving states when travelling through a bend.

BACKGROUND OF THE INVENTION

A sensor system which senses the surroundings of the vehicle is understood to include radar sensors, lidar sensors, video-based or camera-based, fused sensors or other optical sensors. The sensors can emit and receive the information by means of the vehicle in question or obtain it via vehicle-to-vehicle communication or vehicle-to-infrastructure communication. Furthermore, the signals which describe the surroundings of the vehicle can be passed on to the infrastructure or to following vehicles via a satellite-supported and navigation-supported system.

U.S. Pat. No. 5,694,321, which is incorporated by reference, discloses a yaw moment closed-loop controller in which values for a steering angle, a driving speed, a yaw angle speed and a lateral acceleration of the vehicle are measured or determined, wherein a reference or setpoint yaw speed is determined as a function of the steering angle and of the driving speed on the basis of a mathematical reference model, and wherein the difference value between the actual yaw angle speed of the vehicle and the reference or setpoint yaw angle speed is determined. On the basis of the difference value, a torque variable is calculated which is used to define brake pressures which generate an additional yaw moment by means of the brakes of the vehicle. The content of U.S. Pat. No. 5,694,321 is a component of the present application.

With a steering torque assistance system, steering requests which are already compatible in accordance with the closed-loop driving stability control are passed on to the driver. With an actuator of an active front-wheel steering system, a wheel steering angle can be set for performing driving dynamics assistance independently of the driver. In this context, a course which does not correspond to the directional request predefined by the driver is not yet set.

The surroundings detection system such as, for example, "long range radar", detects an object in the direction of travel. This is currently used as a comfort function for the driver for inter-vehicle distance control, but it also provides the possibility of detecting dangerous approaching of an object. In other known systems, the radar is already used in a low-speed range to detect dangerous approaching and to then suitably brake before the object. Other systems detect the hazard of collisions with an object by means of a suitable surrounding sensor system such as a radar sensor system, lidar sensor system and video sensor system, warn the driver, initiate automatic partial braking and finally decelerate as a function of the remaining time to the collision with the object with automatic full braking in order to prevent the collision or at least mitigate it. Further systems are concerned with measures after an initial accident.

A method for predicting a movement trajectory of an object which moves in road traffic. In addition, a device for predicting a movement trajectory of an object which moves in road traffic and is suitable for carrying out the method is disclosed. A method and a device for predicting movement trajectories of a vehicle for preventing a collision, in which method only the trajectories in which, owing to a combination of braking intervention and steering intervention, the forces occurring at the wheels of the vehicle are in the range which corresponds to the maximum force which can be transmitted to the road from the wheel are taken into account for the prediction of the trajectories. An automatic braking and/or steering intervention is carried out as a function of the trajectories which are calculated in advance.

The closed-loop control strategy of the closed-loop driving stability controller or yaw moment controller which is described at the beginning includes a series of compromises which ensures, on the one hand, extremely good stabilization of the vehicle for by far the most driving situations but, on the other hand, also prevents the closed-loop driving stability controller from intervening too early or too violently, which would lead to a restriction in the tolerated driving dynamics or to losses in the closed-loop control comfort. In particular with respect to the driving dynamics which can be achieved with the vehicle, high demands are made of the closed-loop driving stability controller to ensure that the interventions cannot lead to a reduction in a "sporty" driving style. In particular, closed-loop control thresholds of the driving dynamics controller have to be set in such a way that incorrect closed-loop control operations are avoided, which incorrect closed-loop control operations could occur as a result of roadway inclinations and sporty steering prescriptions on race tracks or mountainous roads.

As a result of the widening of closed-loop control thresholds of the closed-loop driving stability controller or the intentionally chronologically delayed intervention by the closed-loop driving stability controller into the brakes or the steering of the vehicle, driving dynamics problems, which could have been avoided with a very early intervention which exhausts all the possibilities can occur in critical situations.

A critical situation is here an unstable driving state in which, in an extreme case, the vehicle no longer follows the driver. The function of a closed-loop driving stability control operation is therefore to give, within the physical limits in such situations, the vehicle the driving behavior which is desired by the driver.

SUMMARY OF THE INVENTION

The invention is based on a desire to develop a method and a device for performing closed-loop or open-loop control of the driving stability of a vehicle to ensure that the closed-loop driving stability control operation can intervene earlier and more strongly in critical situations and with the closed-loop driving stability control operation a collision can also be avoided with objects which are located in the traffic lane.

According to aspects of the invention, this is achieved by means of the further step of activating preparatory measures of the driving dynamics regulator, in particular dynamic switching of closed-loop control parameters when the critical situation in terms of driving dynamics exists.

In addition, the means which receives the signals of the sensor system and subsequently evaluates whether a critical situation in terms of driving dynamics, in particular an imminent collision, exists, and when the situation which is critical in terms of driving exists, the means calculate an avoidance path, and when the situation which is critical in terms of driving exists the closed-loop driving stability control operation takes preparatory measures by dynamically switching over closed-loop control parameters.

According to aspects of the invention, a critical situation is therefore an unstable and dangerous driving state in which, in an extreme case, the vehicle no longer follows the driver and/or a collision was sensed with an object. The function of the closed-loop driving stability control operation according to aspects of the invention is therefore to give, within the physical limits in such situations, the vehicle the driving behavior which is desired by the driver and/or to force the vehicle along a trajectory in order to prevent a collision.

BRIEF DESCRIPTION OF THE DRAWING

The invention is best understood from the following detailed description when read in connection with the accompanying drawing. Included in the drawing is the following figure.

DETAILED DESCRIPTION OF THE PREFERRED EMBODIMENTS

Figure 1:
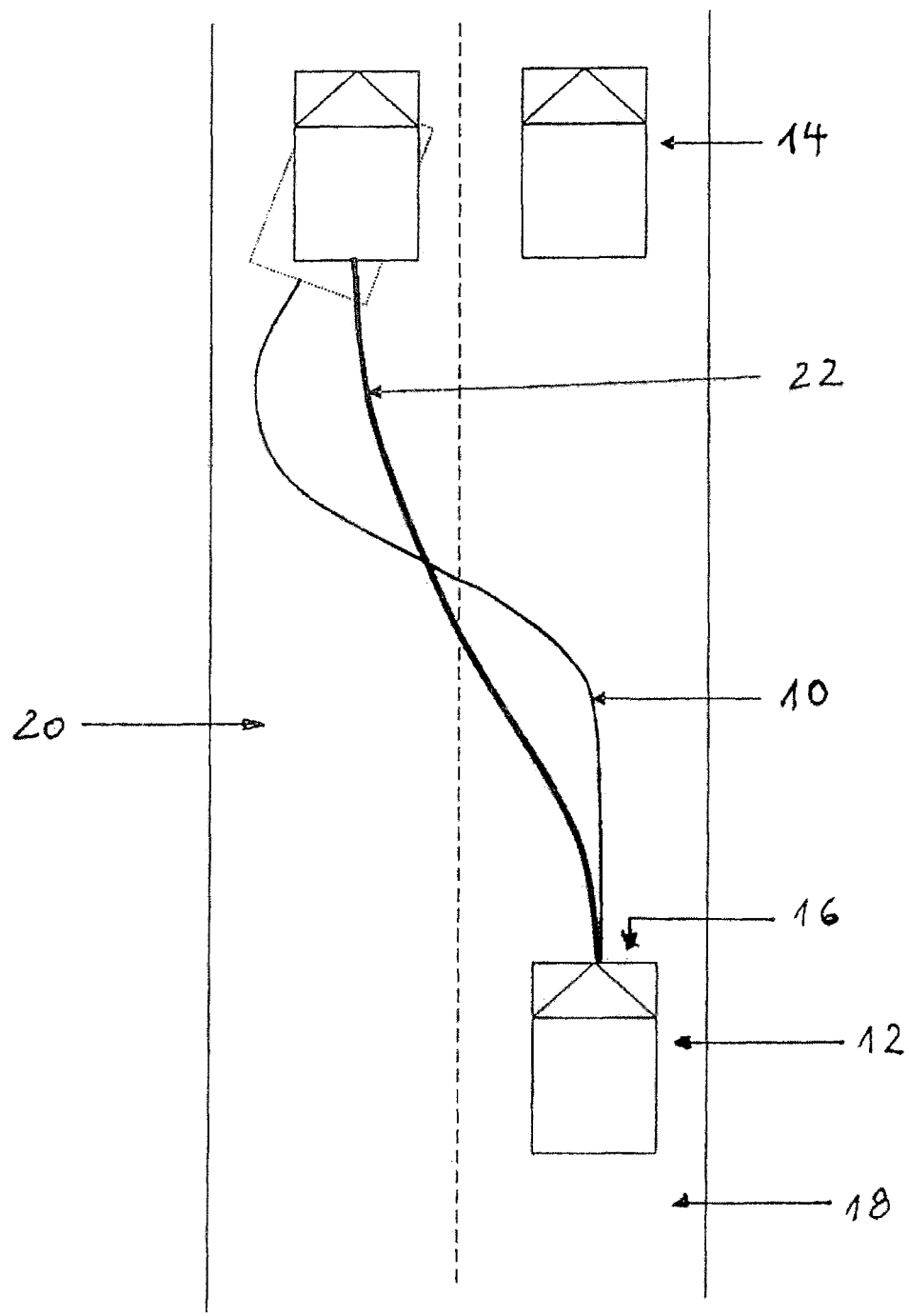
FIG. 1 illustrates an example of an avoidance maneuver of a vehicle.
Figure 2:
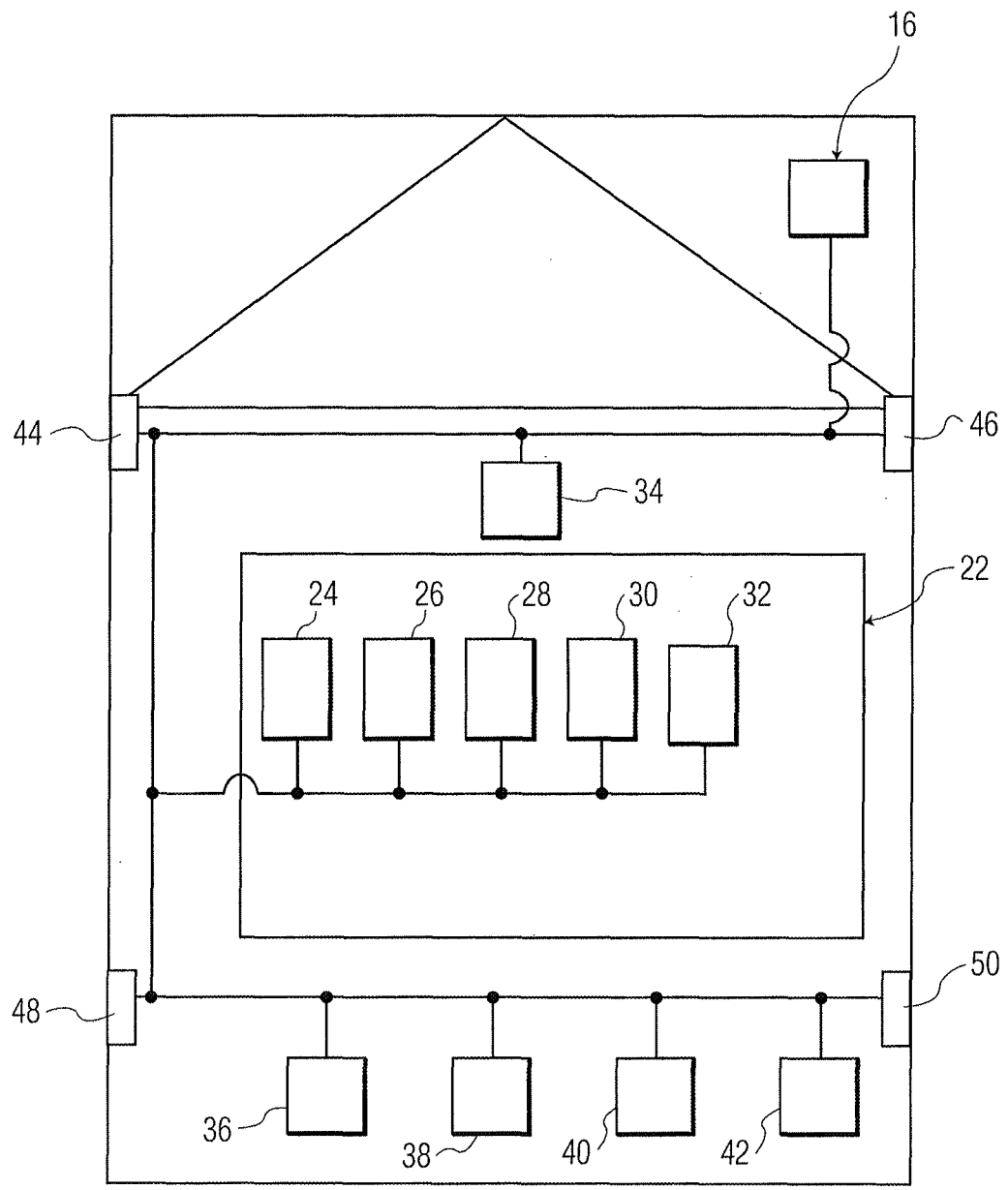
FIG. 2 illustrates an example of a vehicle system for performing open-loop and closed loop control of vehicle stability.

A significant idea of the invention is to perform networking of the driving dynamics regulator 24 with a surrounding sensor system 16. This networking permits, in dangerous and critical situations, the closed-loop driving stability controller 22 to be configured greatly in the direction of the "stability" to the disadvantage of comfort. In this context, the closed-loop driving stability controller or the surrounding sensor system determines based on known surroundings information whether the current driving situation is dangerous and/or critical or not. If the evaluation of the driving situation has revealed that a dangerous and/or critical situation exists, numerous closed-loop control parameters of the closed-loop driving stability control operation can already be switched over proactively dynamically in advance to the imminent dangerous situation as a quasi-preparatory measure. The sensitivity of the closed-loop driving stability controller is influenced here in at least one driving state of the vehicle by at least one signal of the surrounding sensor system. The dangerous situation can be an imminent emergency avoidance maneuver here.

On the basis of an avoidance path or desired trajectory or setpoint trajectory, a setpoint yaw speed of the vehicle is preferably calculated and is made available to the closed-loop control of the driving stability. The driving dynamics regulator compares this setpoint yaw angle speed which is calculated according to the desired trajectory with a measured actual yaw angle speed, wherein the determined difference value is fed to a calculation unit 26 in which a torque variable, which serves to define pressures which, by means of the brakes of the vehicle, generate an additional yaw torque which adds the measured yaw angle speed to the setpoint yaw angle speed which represents the avoidance path or desired trajectory, is calculated.

Instead of a setpoint yaw rate which is calculated according to the desired trajectory, in vehicles with automatically adjustable front wheel steering a setpoint steering angle of the vehicle can be calculated which is made available for performing closed-loop control of the driving stability and for avoiding collisions. Accordingly, the setpoint steering angle is compared with a determined actual steering angle, wherein the detected difference value is fed to a calculation unit in which an adjustment variable is calculated, which adjustment variable serves to define a steering angle which is set at the wheels by means of an active steering system 34 of the vehicle, which system feeds the determined actual steering angle to the setpoint steering angle which represents the desired trajectory.

In one particular embodiment of the invention, the setpoint yaw rate which forces the vehicle onto the desired trajectory is predefined only when the driver triggers this by also at least partially adopting this course, that is to say the driver must steer in the correct direction at least in the first steering phase and not, for example, behave completely passively or even steer in the opposing direction.

The closed-loop driving stability controller for a vehicle having at least four wheels has at least one sensor 36 which generates a yaw speed signal, at least one sensor 38 which generates a lateral acceleration signal, at least one sensor 40 which generates a steering angle signal or steering angle speed signal, at least wheel speed sensors 42 which generate rotational movement signals of the wheels. Furthermore, the closed-loop driving stability controller has an ABS control system 28 and a traction control system 30 and a GMR control system 32. The control systems are connected to the sensors, wherein the GMR control system or the closed-loop driving stability controller is connected to a surrounding sensor system. A calculation unit, for example a vehicle model, is provided within the closed-loop driving stability controller, wherein a model-based coefficient of friction is determined whose output signals ($\mu$) are fed to the calculation unit or the vehicle model and are therefore taken into account in the calculation of the setpoint value of the yaw angle speed ($\dot{\psi}_{setp}$).

So that the closed-loop driving stability controller intervenes as early and as hard as possible if a dangerous and/or critical situation such as an avoidance maneuver in a tight space is determined, there is advantageously provision that the preparatory measures comprise the reduction of closed-loop control thresholds or parameters. For example, the coefficient of friction which is determined at the prescription of the setpoint yaw speed for the avoidance trajectory or desired trajectory, in particular in the opposing steering phase, can be modified as a parameter. The maximum coefficient of friction is reduced compared to the actually estimated coefficient of friction, that is to say for example instead of $\mu=1.0$ only the maximum value $\mu=0.7$ or 0.8 is permitted on roadways with a high coefficient of friction. This limitation of the coefficient of friction indirectly reduces the maximum yaw angle speed or yaw rate and therefore also the maximum lateral dynamics of the vehicle. This leads, specifically in the case of an opposing steering maneuver, to a very early and hard GMR intervention which greatly suppresses veering off of the rear part of the vehicle.

The method of reducing the coefficient of friction generally leads to a hard GMR intervention, and therefore to limitation of the vehicle dynamics and to an extremely stable driving behavior. It is possible in this context for the setpoint yaw rate to occur both on the basis of the trajectory and as before on the basis of the driver's request (driver's steering angle). Both methods are basically possible and limit the vehicle dynamics very effectively.

So that the closed-loop driving stability controller intervenes as early and as hard as possible if a critical situation such as an avoidance maneuver in a tight space is determined, there is advantageous provision that the preparatory measures comprise the reduction, in particular to zero, of intervention delay times.

So that the closed-loop driving stability controller intervenes as early and as hard as possible when a critical situation such as an avoidance maneuver in a tight space is determined, there is furthermore advantageous provision that the preparatory measures take the form of open-loop or closed-loop control with pilot-control components which are calculated from the steering angle predefined by the driver. In this context, the absolute steering angle and the steering angle speed are taken into account.

An expedient embodiment of the method is defined in that the preparatory measure comprises pre-charging the brakes 44, 46, 48 and 50.

A device for performing closed-loop control of the driving stability and for avoiding collisions is advantageously embodied in such a way that it has a closed-loop driving stability controller which contains means for acquiring input variables and for defining interventions into individual brakes of the vehicle, and a sensor system which senses the surroundings of the vehicle and which emits and receives radar signals or lidar signals or receives video signals. The device is advantageously defined in that the means receives the signals of the sensor system and subsequently evaluates whether a critical situation in terms of driving dynamics, in particular an imminent collision, exists, in that, when the situation which is critical in terms of driving exists, the means calculate an avoidance path in a known fashion, and in that the closed-loop driving stability control operation takes preparatory measures when the situation which is critical in terms of driving exists, by dynamically switching over closed-loop control parameters.

In addition, a closed-loop driving stability controller for a vehicle having at least four wheels for carrying out the method is embodied in such a way that the closed-loop driving stability controller has a sensor which generates a yaw speed signal, a sensor which generates a lateral acceleration signal, a sensor which generates a steering angle sensor, wheel speed sensors which generate rotational movement signals of the wheels, and an ABS control system and a traction control system and a GMR control system which are connected to the sensors, wherein the GMR control system is advantageously connected to a surrounding sensor system.

FIG. 1 illustrates an example of an avoidance maneuver of the vehicle 12 with a trajectory 10 which arises as a result of the driver's prescription. The vehicle 12 has a yaw moment controller which is known in its basic function and is as described, for example, in DE 195 15 048 A1. In this context, the obstacle, for example an end of congestion, is denoted by 14, the lane of the vehicle 12 by 18 and the avoidance lane by 20. The vehicle 12 is equipped with at least one surrounding sensor 16 which is known per se and which senses the surroundings of the vehicle. The signals of the surrounding sensor or the fused signals of the surrounding operation sensors are fed to means or to a calculation unit which is contained in the GMR controller which is modified compared to the yaw moment controller described in DE 195 15 048 A1. The calculation unit receives the signals of the sensor system and evaluates them with respect to a danger potential, i.e. whether a critical situation in terms of driving dynamics, in particular an imminent collision with the obstacle 14, exists. If the critical situation in terms of driving dynamics exists, preparatory measures of the GMR controller are initiated by calculating an optimum setpoint trajectory 22 as an avoidance path, determining pressures for individual brakes of the vehicle on the basis of a plurality of input variables and by switching over the closed-loop control parameters dynamically. The dynamic switching over of the closed-loop control parameters comprises reducing closed-loop control thresholds. In this context, the amplifications are increased and the intervention delay times are reduced. The intervention delay times are advantageously reduced to zero. Furthermore, the preparatory measures take the form of open-loop or closed-loop control with pilot-control components which are calculated from the steering angle predefined by the driver, wherein the open-loop or closed-loop control with pilot-control components takes into account the absolute steering angle and the steering angle speed. In addition, the preparatory measures comprise pre-charging the brakes.

In the calculation unit of the GMR controller, a setpoint yaw speed of the vehicle, which is made available to the closed-loop control of the driving stability, is calculated on the basis of the avoidance path. In this context, the setpoint yaw angle speed is compared with a measured actual yaw angle speed, wherein the detected difference value is fed to the calculation unit in which a torque variable is calculated, which torque variable is used to define pressures which generate an additional yaw moment by means of the brakes of the vehicle, which additional yaw moment feeds the measured yaw angle speed to the setpoint yaw angle speed which represents the avoidance path 22. In addition or instead, a setpoint steering angle of the vehicle can be calculated on the basis of the avoidance path, which setpoint steering angle is made available to the closed-loop control of the driving stability. This setpoint steering angle is compared with a determined actual steering angle, wherein the detected difference value is fed to the calculation unit in which an adjustment variable is calculated, which adjustment variable serves to define a steering angle which is set at the wheels by means of an active steering system of the vehicle, and which active steering system feeds the determined actual steering angle to the setpoint steering angle which represents the avoidance path 22.

The invention claimed is:

1. A method for performing open-loop or closed-loop control of the driving stability of a vehicle and for avoiding collisions with an object which is located in the traffic lane, comprising:
- determining, by a processor, based on environmental signals from the surroundings of the vehicle, whether a critical situation in terms of driving dynamics exists,
- calculating, by the processor, an avoidance path if a critical situation in terms of driving dynamics exists, wherein the critical situation is an imminent collision,
- determining, by the processor, based on a plurality of input variables pressures for individual brakes of the vehicle, and
- activating, by the processor, preparatory measures of a driving dynamics regulator when the critical situation in terms of driving dynamics exists, the preparatory measures comprise reducing an estimated coefficient of friction based on the avoidance path, and in response to reducing the estimated coefficient of friction, reducing a maximum yaw rate that is dependent on the coefficient of friction,
- calculating, by the processor, a yaw rate of the vehicle associated with the avoidance path,
- comparing, by the processor, the calculated yaw rate to the maximum yaw rate, and
- activating, by the processor, the closed-loop control so that the calculated yaw rate is maintained at a rate less than the maximum yaw rate.

2. The method as claimed in claim 1, wherein the processor sets pressures which, by means of the brakes of the vehicle, generate a yaw torque which controls the calculated yaw rate of the vehicle based on the avoidance path.

3. The method as claimed in claim 1, wherein a setpoint steering angle of the vehicle which is made available to perform closed-loop control of the driving stability is calculated on the basis of the avoidance path.

4. The method as claimed in claim 3, wherein the setpoint steering angle is compared with a determined actual steering angle, wherein the detected difference value is fed to a calculation unit in which an adjustment variable is calculated, which adjustment variable serves to define a steering angle which is set at the wheels by means of an active steering system of the vehicle, and which controls the actual steering angle to approach the setpoint steering angle which represents the avoidance path.

5. A device for performing closed-loop control of the driving stability and for avoiding collisions comprising:
- a closed-loop driving stability controller for acquiring input variables and for defining interventions into individual brakes of the vehicle, and
- a sensor system which senses the surroundings of the vehicle and which emits and receives radar signals or lidar signals or receives video signals,
- wherein the closed-loop stability controller receives the signals of the sensor system and subsequently evaluates whether a critical situation in terms of driving dynamics exists, the critical situation is an imminent collision,
- wherein the closed-loop driving stability controller:
- calculates an avoidance path and activates preparatory measures including reducing an estimated coefficient of friction based on the avoidance path when a critical situation in terms of driving dynamics exists, and in response to reducing the estimated coefficient of friction, reducing a maximum yaw rate that is dependent on the coefficient of friction,
- calculates a yaw rate of the vehicle associated with the avoidance path,
- compares the calculated yaw rate to the maximum yaw rate, and
- activates the closed-loop control so that the calculated yaw rate is maintained at a rate less than the maximum yaw rate.

* * * * *